United States Patent [19]

Kennedy et al.

[11] Patent Number: 5,663,245
[45] Date of Patent: Sep. 2, 1997

[54] STAR POLYMERS HAVING A WELL-DEFINED SILOXANE CORE AND MULTIPLE POLYISOBUTYLENE ARMS AND A METHOD FOR THE SYNTHESIS THEREOF

[75] Inventors: Joseph P. Kennedy; Naoki Omura, both of Akron; Alexander Lubnin, Fairlawn, all of Ohio

[73] Assignee: The University of Akron, Akron, Ohio

[21] Appl. No.: 620,421

[22] Filed: Mar. 22, 1996

[51] Int. Cl.[6] .................................... C08G 77/12
[52] U.S. Cl. .................... 525/479; 525/106; 525/25; 525/15; 525/31
[58] Field of Search .................... 528/15, 25, 31; 525/106, 475

[56] References Cited

U.S. PATENT DOCUMENTS

| | | | |
|---|---|---|---|
| 3,691,257 | 9/1972 | Kendrick et al. | 525/479 |
| 4,386,135 | 5/1983 | Campbell et al. | 428/447 |
| 4,675,346 | 6/1987 | Lin et al. | 522/39 |
| 5,036,139 | 7/1991 | Spinelli | 525/326.5 |
| 5,057,576 | 10/1991 | Spinelli | 525/267 |
| 5,276,095 | 1/1994 | Hoxmeier | 525/105 |
| 5,276,110 | 1/1994 | Zhou et al. | 525/479 |
| 5,281,666 | 1/1994 | Hoxmeier | 525/105 |
| 5,378,790 | 1/1995 | Michalczyk et al. | 528/35 |
| 5,395,885 | 3/1995 | Kennedy et al. | 525/98 |
| 5,451,637 | 9/1995 | Leibfried | 525/105 |

*Primary Examiner*—Ralph H. Dean
*Attorney, Agent, or Firm*—Renner, Kenner, Greive, Bobak, Taylor & Weber

[57] ABSTRACT

The synthesis and characterization of novel multi-arm star polymers comprising polyisobutylene arms connected to a well-defined, siloxane core are described. The synthesis has been achieved by hydrosilating olefin-capped (e.g., allyl- or isopropenyl-terminated) polyisobutylene with siloxanes carrying a plurality of Si—H groups.

16 Claims, 2 Drawing Sheets

STAR POLYMERS HAVING A WELL-DEFINED SILOXANE CORE AND MULTIPLE POLYISOBUTYLENE ARMS AND A METHOD FOR THE SYNTHESIS THEREOF

The research disclosed in this application was at least partially supported by the National Science Foundation under Grant 94-23202.

TECHNICAL FIELD

This invention relates generally to star polymers. More particularly, this invention relates to star polymers having multiple, well-defined arms of polyisobutylene emanating from well-defined cores of siloxane, and preferably, cyclosiloxanes. Specifically, the invention relates to the synthesis of star-shaped polyisobutylenes by linking olefin-terminated polyisobutylene arms with multi-functional hydrogen cyclosiloxanes via hydrosilation.

BACKGROUND OF THE INVENTION

The synthesis of various multi-arm radial or star polymers have become of growing practical and theoretical interest to a variety of industries. Such star polymers are seen as useful as, inter alia, surfactants, lubricants, rheology modifiers, and viscosity modifiers. In fact, star polymers are now considered by many to be state-of-the-art viscosity modifiers and oil additives, although the potential of some of these star polymers for these applications is still being evaluated and tested.

One well-known representative of this class of materials currently being used as an oil additive is commercially available from the Shell Oil Co. (Houston, Tex.) under the tradename Shelvis. This oil additive is a multi-arm star molecule consisting of many hydrogenated polyisoprene arms emanating from an ill-defined core of crosslinked polydivinylbenzene (PDVB). By the term "ill-defined" it is meant that the core of the star polymer, e.g., PDVB, is an uncontrolled, crosslinked, gel-like structure having unsaturation sites in the core. In comparison, "well-defined" cores are built of readily characterizable, soluble molecules which are precursors to the core. As a result, the structure of the resultant star polymers having well-defined cores can be controlled.

Also, it is believed that the resultant star polymers having well-defined cores may impart better shear stability than star polymers using ill-defined cores. That is, the presence of unsaturation sites (i.e., double bonds) in the ill-defined cores (PDVB) provides for the possibility that the resultant star polymers will be less shear stable and more sensitive to oxidative reactions than the star polymers having well-defined cores. Thus, in engine oil where shear stability is of critical importance, the possibility exists that during high temperature use and heavy shear in the engine, the ill-defined cores will degrade.

Similarly, the polyisoprene arms in the Shelvis product may contain some unsaturation which is also undesirable. Like the core, the presence of double bonds in the arms may cause them to decompose as well during high temperature and heavy shear conditions within the engine.

Recently, there has been a growing interest in star polymers consisting of multiple polyisobutylene (PIB) arms. For example, Kennedy et al. U.S. Pat. No. 5,395,885 describes the synthesis of star polymers having multiple PIB arms and PDVB cores using cationic synthesis techniques. Because the structure of polybutylene is readily characterized and contains no unsaturation, these PIB-based stars are suspected to be useful for a variety of applications such as motor oil additives and viscosity index improvers. However, their potential is still being evaluated and tested, and in motor oil additives where shear stability is of critical importance, the possibility remains that, because of the use of ill-defined, crosslinked aromatic cores such as PDVB, the PIB—PDVB stars currently being tested may not be highly desirable for such use.

On the other hand, studies have demonstrated that silicone oils apparently have superior shear stability properties as compared to hydrocarbon oils. For example, Fitzsimmons et al., in *Trans. ASME*, 68, 361 (1946), have shown that the viscosity of a silicone oil decreased less than 2 percent after 105,000 cycles, whereas the viscosity of a hydrocarbon oil dropped by more than 50 percent after only 18,000 cycles under certain operating conditions in an aircraft gear pump. Thus, it is seen as highly desirable to provide a star polymer having multiple well-defined polyisobutylene arms and a well-defined, silicone-based core which polymer would be shear-stable.

However, heretofore, polyisobutylenes have been thought to be incompatible with silicone compounds. That is, the polyisobutylenes have a tendency to segregate from siloxane compounds when mixed. Thus, linking polyisobutylene arms to siloxane cores to form multi-arm polyisobutylenes has heretofore never been accomplished.

Beyond the advantages described hereinabove, it is believed that resultant star polymers having polyisobutylene arms and siloxane cores will be more acid-base stable than other siloxane-containing compounds. For example, it is well known that Si—O groups are easily hydrolyzable in the presence of strong acids. However, it is believed that the polyisobutylene arms of the subject polymer protect the Si—O groups from hydrolytic attack, thereby aiding in the acid-base stability of the polymer.

Furthermore, because it would be a star polymer, the siloxane-containing polyisobutylene composition would have a lower viscosity and higher molecular weights than other siloxane-containing polymers. Such properties are seen as being highly desirable for a variety of applications.

SUMMARY OF INVENTION

It is, therefore, an object of the present invention to provide a composition of matter having a plurality of well-defined polyisobutylene arms connected to a well-defined, easily characterized siloxane core.

It is another object of the present invention to provide a composition of matter, as above, which may be shear-stable and acid-base stable.

It is yet another object of the present invention to provide a siloxane-containing composition of matter, as above, which has a low viscosity and high molecular weight.

It is still another object of the present invention to provide a composition of matter, as above, which includes multiple polyisobutylene arms linked to a siloxane core containing at least two Si—H group.

It is a further object of the present invention to provide a method for synthesizing multi-arm polyisobutylenes having a siloxane core.

It is yet a further object of the present invention to provide a method for synthesizing star-shaped polyisobutylenes with siloxane cores wherein the resultant structure of the siloxane core and polyisobutylene arms can be readily controlled.

It is still a further object of the present invention to provide a method for synthesizing higher order star-shaped polyisobutylenes.

At least one or more of the foregoing objects, and possibly other aspects of the invention which will become apparent as the detailed description proceeds, are achieved by a novel polymeric composition of matter comprising a core component selected from the group consisting of siloxanes containing at least two Si—H groups; and a plurality of arms attached to the core component and being selected from the group consisting of olefin-terminated polyisobutylenes.

Other objects or aspects of the invention which will become apparent herein are attained by a method for synthesizing a polymeric composition containing a well-defined, siloxane core having Si—H groups and a plurality of olefin-terminated polyisobutylene arms emanating from the siloxane core, comprising the step of linking the polyisobutylene arms to the siloxane core by hydrosilation.

BRIEF DESCRIPTION OF THE DRAWINGS

For a complete understanding of the objects, techniques and structure of the invention, reference should be made to the following detailed description of a preferred embodiment and the accompanying drawings wherein.

PREFERRED EMBODIMENT FOR CARRYING OUT THE INVENTION

Figure 1:
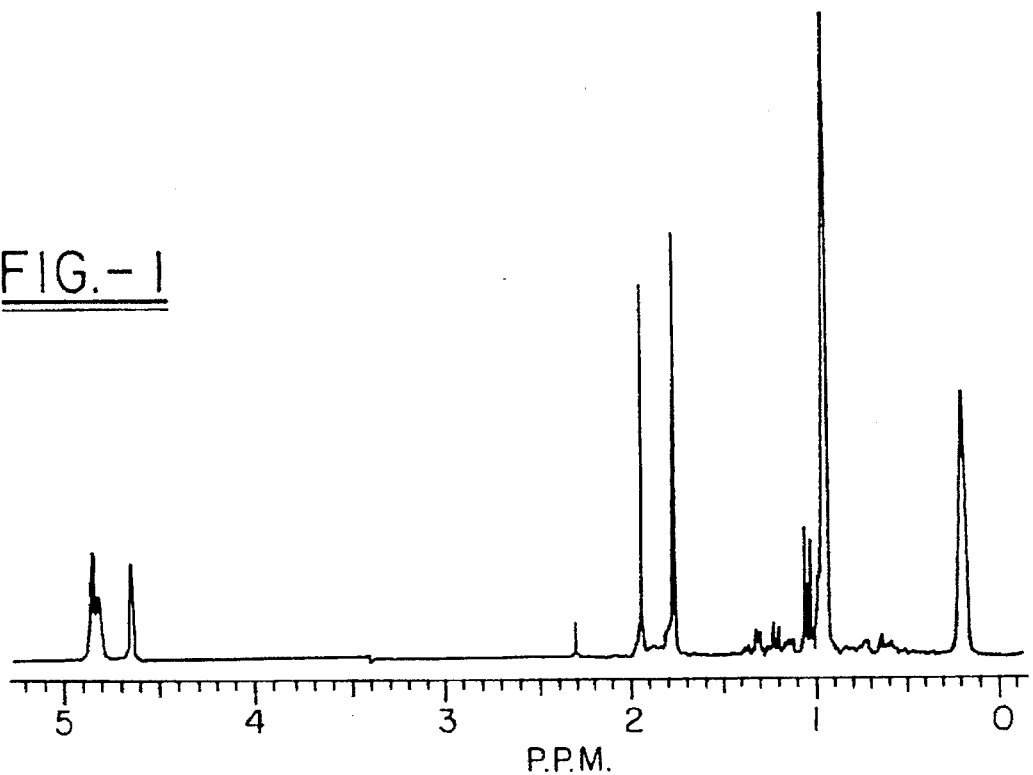
FIG. 1 is a representative $^1$H-NMR (200 MHz) spectrum of the reaction mixture of hexamethylcyclohexasiloxane ($D_6^H$) and 2,4,4-trimethyl-1-pentene (TMP) ([Si—H]/[C=C]=1, [Pt]=16 ppm) after 2 hours at room temperature wherein methyl protons of toluene (solvent for catalyst) at 2.3 ppm were used to reference the spectrum.

The present invention is directed toward the synthesis of star polymers having multiple polyisobutylene arms emanating from well-defined cores. Unlike prior attempts at producing star-shaped polyisobutylenes which used crosslinked, aromatic cores such as PDVB, the present invention employs well-defined, easy-to-characterize siloxane cores which yield relatively simple core architectures. In contrast, PDVB cores are complex networks whose detailed structural characterization is nearly impossible.

The multi-arm star polymers prepared in accordance with the present invention are synthesized in essentially three separate steps—(1) preparation of the polyisobutylene arms, (2) preparation of the siloxane core, and (3) linking the arms to the core. Each of these steps are more particularly discussed hereinbelow with respect to the preferred embodiment for carrying out the invention.

Preparation of the Polyisobutylene Arms— Polymerization Step

The PIB arms suitable for linking to functional siloxane cores are olefin-terminated polyisobutylenes of desired molecular weights. The preferred olefin-terminated polyisobutylene arms, or "prearms" since they are not yet connected to the core, are α-tert-butyl-ω-allyl-polyisobutylenes (PIB—CC=C) or α-tert-Butyl-ω-isopropenyl-polyisobutylenes (PIB—CC(C)=C) having the following basic structures:

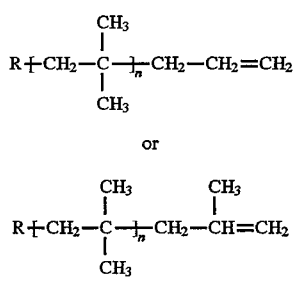

respectively, wherein R may be the same as the allyl- or isopropenyl-terminated end or, alternatively, may be a different terminus known in the art including, but not necessarily limited to, a hydrogen, a methyl group, or a halogen.

Various routes for the synthesis of olefin-ended PIB prearms may be known in the art, and any route which provides the proper olefin-terminated PIB prearms will be suitable for the present invention. For instance, allyl- or isopropenyl-ended PIBs have been prepared by living polymerization of isobutylene to practically any lengths (and, therefore, to practically any desired molecular weight) followed by quantitative end-functionalization to the —CH$_2$CH=CH$_2$ or —CH$_2$C(CH$_3$)=CH$_2$ terminus.

With respect to the preferred embodiment, α-tert-butyl-ω-allyl-polyisobutylenes (PIB—CC=C) were prepared by a one-pot, two-step method. Living isobutylene polymerization was induced to obtain chlorine-terminated polyisobutylenes by the use of a 2-chloro-2,4,4-trimethylpentane/TiCl$_4$ initiating system in the presence of N,N-dimethylacetamide as the electron pair donor. A detailed description of this procedure is set forth in "Electron Pair Donors in Carbocationic Polymerization. III. Carbocation Stabilization by External Electron Pair Donors in Isobutylene Polymerization", Kaszas et al., *J. Macromol. Sci. Chem.*, A26, 1099–1114 (1989), the disclosure of which is incorporated herein by reference. After completion of the polymerizations, the living polymers were then quenched in situ by a 10-fold excess of allyltrimethylsilane (AllSiMe$_3$) which provides PIB—CC=C. A detailed description of this procedure is set forth in "Electrophilic Substitution of Organosilicon Compounds II. Synthesis of Allyl-terminated Polyisobutylenes by Quantitative Allylation of tert-Chloro-Polyisobutylenes with Allyltrimethylsilane", Wilczek et al., *J. Polym. Sci.: Polym. Chem.*, 25, 3255–3265 (1987), the disclosure of which is incorporated herein by reference.

To obtain α-tert-Butyl-ω-isopropenyl-polyisobutylenes (PIB—CC(C)=C), dehydrochlorination of the chlorine-terminated polyisobutylenes (PIB—Cl) was induced as set forth in "New Telechelic Polymers and Sequential Copolymers by Polyfunctional Initiator-Transfer Agents (Inifers) V. Synthesis of α,ω-Di(isopropenyl)-polyisobutylenes", Kennedy et al., *Polym. Bull.*, 1, 575–580 (1979), the disclosure of which is also incorporated herein by reference. The resultant olefin-capped (e.g., allyl-terminated or isopropenyl-terminated) polyisobutylenes were then characterized by $^1$H-NMR spectroscopy and gel permeation chromatography (GPC). These polymerization processes have been characterized as efficient processes for polymerizing isobutylene.

Preferred polyisobutylenes will have number average molecular weights of from about 500 to about 50,000 g/mol and more preferably, from about 1000 to about 20,000 g/mol, although larger or smaller units may be employed depending upon the circumstances involved.

Preparation of Siloxane Core

Siloxane cores suitable for use in conjunction with the present invention are those siloxane having functional Si—H groups somewhere in the polymer chain. It will be appreciated that the siloxane core may be linear or cyclic, and either structure is seen as being capable of providing the characteristics desired of cores for various applications, including viscosity improvers. However, cyclosiloxanes are preferred since these structures are more generally associated with and provide the optimal characteristics and/or configuration of star polymers.

Generally, the resultant polymer stars can be synthesized by the use of various silane ring compounds having the structure:

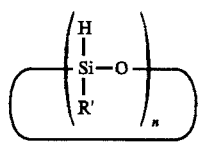

where n may be any integral number from about 3 to 20 or more, depending upon the composition desired. More preferably, n=4, 5, 6, 7, or 8. R' may be H, $CH_3$, or any other functional or nonfunctional group limited only by its usefulness to the present invention. Such structures where R'=$CH_3$ are conventionally abbreviated in the art as $D_n^H$, and are referred to hereinbelow in this manner.

An example of a preferred cyclosiloxane compound is hexamethylcyclohexasiloxane ($D_6^H$). $D_6^H$ may be prepared by the hydrolysis of methyldichlorosilane as is well known in the art and as is described in Curry, U.S. Pat. No. 3,484,468, the disclosure of which is incorporated by reference. The structure of $D_6^H$ is shown below.

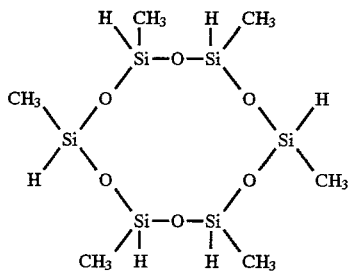

Also preferred and suitable as the siloxane core for the present invention is hydrogenoctasilsesquioxane ($T_8^H$). This cyclic compound may be prepared by the hydrolysis of trichlorosilane as is more particularly described in "New Synthetic Route to the Hydridospherosiloxanes—$O_h$—$H_8Si_8O_{12}$ and $D_5H$—$H_{10}Si_{10}O_{15}$" P. A. Agaskar, *Inorg. Chem.*, 30, 2707 (1991), the disclosure of which is incorporated herein by reference. The cubic-like structure of $T_8^H$ is shown hereinbelow.

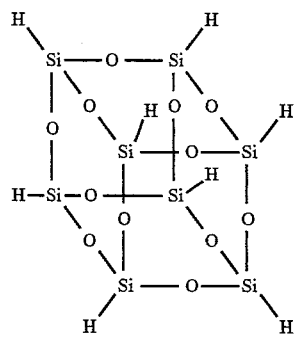

Again, it will be appreciated that the major advantage of these cyclosiloxane cores (e.g., $D_6^H$ and $T_8^H$) over those cores of PDVB is that the former cores are individual, well-defined cyclic compounds and, therefore, yield relatively simple core architectures, as compared to the complex networks created by the PDVB cores, whose characterization is practically impossible.

Linking PIB Prearms to Siloxane Core

Once the desired PIB prearms and siloxane cores are formed, the PIB prearms may be linked to the well-defined siloxanes containing a desirable number of Si—H functions by hydrosilation. An illustrative scheme for production of the resultant multiple PIB-arm star polymer using PIB—CC=C and $D_6^H$ is shown below.

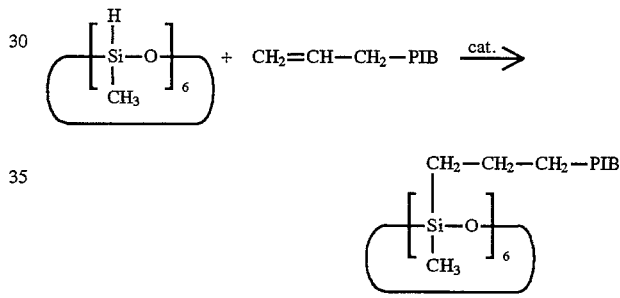

It will be appreciated that the resultant $D_6^H$+PIB—CC=C structure provided directly above is only one of many possible structures which could be synthesized according to the concepts of the present invention. In particular, it should be understood that the resultant composite could contain any number of Si(R')—O units where R' is shown as $CH_3$, but as noted earlier, may be any functional or non-functional group. Thus, the number 6 in the scheme above can generally be replaced with "n" which preferably equates to about 3 to 20. Furthermore, it will be appreciated that PIB, as presented directly above, may include any number of repeating units of the monomer isobutylene plus a terminus, identified earlier as R, wherein R may be the same as or different from the allyl or isopropenyl termini.

Essentially, any siloxane having more than one functional Si—H groups can be used to link a plurality of olefin-terminated polyisobutylenes having any number of repeating units to it by hydrosilation. The number of polyisobutylenes which can be linked is believed to substantially equate to the number of Si—H groups available.

Moreover, the resultant structure can be a "true" star polymer, as would typically be the case where the siloxane used is a cyclosiloxane, or a polymeric composition based on a linear siloxane compound. In any event, it will be appreciated that the structure of the resultant composition is at least to some extent dependent upon the structure of the siloxane core.

Returning to the preferred embodiment, PIB—CC=C, $D_6^H$ and an effective amount of $H_2PtCl_6$ for catalyzing the reaction are mixed and stirred to produce the resultant polymers having multiple polyisobutylene arms emanating from the cyclosiloxane cores. The reactions are not only fast, but also very efficient for the production of the resultant polymers. Moreover, since hydrosilation has been demonstrated to be an essentially quantitative reaction, it is believed that the subject process can be performed not only in the research laboratory, but on a commercial scale as well.

It will also be evident that preferred molecular weights for the resultant compositions will be substantially the molecular weight of the polyisobutylene arms employed times the number of arms found in the composition. Of course, the core will have some molecular weight, but this is seen as insignificant as compared to the weight of the arms.

In order to demonstrate practice of the present invention, several polymeric compositions having a plurality of olefin-terminated polyisobutylene arms linked to siloxane cores containing Si—H groups were prepared according to the concepts of the present invention. The following is a detailed description of the process(es) used for carrying out the present invention. It will be appreciated that this description is illustrative only and not meant to limit the invention, as measured by the scope and spirit of the claims.

Initially, while hydrosilation of PIB—CC=C was believed to proceed rapidly and without significant steric hindrance, due to the fact that the unsaturated allyl endgroups in PIB—CC=C are relatively unencumbered, it was suspected the isopropenyl endgroups in PIB—CC(C)=C would be more hindered and have lower reactivity. Thus, it was deemed necessary to initially carry out hydrosilation model experiments using 2,4,4-trimethyl-1-pentene (TMP) (Aldrich) to establish satisfactory hydrosilation conditions with isopropenyl-capped polyisobutylenes. It will be appreciated that TMP has the same essential structure as a short chain PIB—CC(C)=C and essentially mimics the isopropenyl termini of PIB—CC(C)=C.

In the model experiments, TMP was mixed with $D_6^H$, $T_8^H$, and a linear siloxane, namely poly (methylhydrogensiloxane) ($MD_{38}^H M$, where 38 is the number average degree of polymerization), each individually. TMP was distilled from $CaH_2$ (Aldrich) before use. $MD_{38}^H M$ was received from Shin-Etsu Chemical Co., Ltd. and used as received. A $^1H$ NMR spectrum of the compound showed an Si—H signal at 4.7 ppm for this compound. The structure for $MD_{38}^H M$ is shown below.

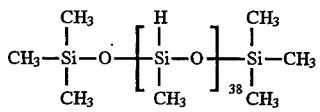

$D_6^H$ was prepared by the hydrolysis of methyldichlorosilane as discussed above. More particularly, to a stirred solution of 222.4 g (3 moles) tert-butanol (Aldrich) in 1 L benzene (Aldrich), 172.6 g (1.5 moles) $MeSiCl_2H$ (Aldrich) was added dropwise during a 6 hour period at room temperature and subsequently stirred another 12 hours. The reaction mixture separated into two layers. The organic layer was decanted. Benzene and tert-butyl-chloride were distilled off at a reduced pressure, and the remaining mixture of siloxanes was distilled under reduced pressure on a spinning band column (Nester/Faust, 75 theoretical plates). A fraction of bp 96° C./30 mm Hg (compare with bp 92.6°–93° C./21 mm Hg) was collected and yielded approximately 11.1 g (12.4%). GC analysis showed this fraction to be essentially pure $D_6^H$ (98%). The product was stored over $CaH_2$ in a capped polypropylene test tube. $^1H$-NMR ($CDCl_3$): δ=0.19 (s, 3H in Si—$CH_3$); 4.8 (s, 1H in Si—H).

$T_8^H$ was prepared by the hydrolysis of 26.6 g trichlorosilane (Aldrich) as noted above. The pure product (1.24 g, 12.0% yield) was obtained as colorless needles by recrystallization from hexanes solution. H-NMR ($CDCl_3$): δ=4.23, $^1J_{H,Si}$=170 Hz; 4.1 (s, 1H in Si—H).

In carrying out the experiment using TMP and $D_6^H$, a mixture of 1.08 g (9.6 mmol) TMP, 0.29 g (0.80 mmol) $D_6^H$, and 3.3 µL $H_2PtCl_6$ catalyst solution of a 2 wt. % Pt in 2-ethylhexanol (Shin-Etsu Chemical Co., Ltd.) was stirred at 70° C. for about 16 hours. The solution was treated with 1 mg activated carbon to remove the catalyst and filtered. Excess TMP was removed in vacuo to yield a viscous liquid, and the resultant composite, $D_6^{TMP}$, was then characterized by $^1H$-NMR spectroscopy. $^1H$-NMR ($CDCl_3$): δ=0.10 (s, 3H,Si—$CH_3$); 0.37–0.75 (m, 2H, Si—$CH_2$—); 0.87 (s, 9H, $3CH_3$ in tBu group); 00.95 (d, 3J=6.8 Hz, 3H, $CH_3$ in $CH_3$—CH<); 1.09–1.38 (m, 2H, $CH_2$ in tBu—$CH_2$); 1.70–1.88 (m, 1H, CH in $CH_3$—CH<). $^{13}C$-NMR ($CDCl_3$): δ=1.3 si—$CH_3$); 25.5 (CH in $CH_3$—$CH_,$); 25.6 ($CH_3$ in $CH_3$—$CH_,$); 29.6 ($CH_2$ in $CH_2$—Si); 30.4 ($3CH_3$ in tBu); 31.3 (C in tBu); 55.2 ($CH_2$ in tBu—$CH_2$—). The resultant $D_6$TMP structure is provided hereinbelow.

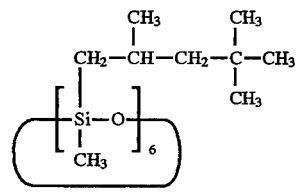

As can be seen in FIG. 1, the $^1H$-NMR spectrum of the resultant composite, $D_6^{TMP}$, indicated complete consumption of Si—H, as indicated by the absence of signal at 4.8 ppm, where Si—H was identified in $D_6^H$. In other words, the conversion of Si—H functional groups were determined after removing the excess TMP and by comparing the integrated intensity of the Si—H signals at approximately 4.8 ppm and that of the t-butyl group signal at about 0.9 ppm. Conversions were calculated by:

$$\text{Conversion} = \frac{I_{0.9}/9}{I_{0.9}/9 + I_{4.8}} \cdot 100\%$$

where $I_{0.9}$ and $I_{4.8}$ are the integrated intensities of the Si—H and $(CH_3)_3C$ signals, respectively.

Next, $MD_{38}^{TMP}M$ was synthesized by the same procedure as $D_6^{TMP}$ using $MD_{38}^H M$ instead of $D_6^H$. $^1H$-NMR ($CDCl_3$): δ=0.09 (s, 3H, Si—$CH_3$); 0.38–0.78 (m, 2H, Si—$CH_2$—); 0.88 (s, 9H, $3CH_3$ in tBu); 0.97 (d, $^3J$=6.0 Hz, 3H, $CH_3$ in $CH_3$—CH<); 1.04–1.32 (m, 2H, $CH_2$ in tBu—$CH_2$—); 1.74 (m, 1H, CH in $CH_3$—CH<). $^{13}C$-NMR ($CDCl_3$): δ=1.3 (Si—$CH_3$); 25.5 (CH in $CH_3$—CH<); 25.6 ($CH_3$ in $CH_3$—CH<) 29.6 ($CH_2$ in —$CH_2$—Si); 30.4 ($3CH_3$ IN tBu); 31.3 (C in tBu); 55.2 ($CH_2$ in tBu—$CH_2$—). Like $D_6^{TMP}$, the $^1H$-NMR spectrum of the resultant $MD_{38}^{TMP}M$ composite indicated nearly complete consumption of Si—H at 4.7 ppm. The resulting structure is shown hereinbelow.

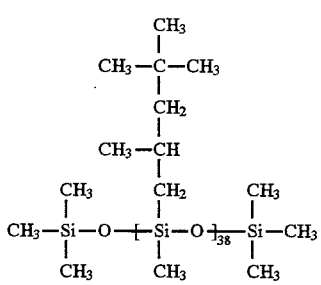

The above procedure was also used to obtain $T_8^{TMP}$ using $T_8^H$. TMP was used in 2.5 molar excess and the reaction was carried out for 40 hours. The resultant product was a viscous liquid. $^1$H-NMR (CDCl$_3$): δ=0.46–0.75 (m, 2H, Si—CH$_2$—); 0.87 (s, 9H, 3CH$_3$ in tBu); 0.97 (d, $^3$J=6.6 Hz, 3H, CH$_3$—CH<); 1.09–1.38 (m, 2H, CH$_2$, in tBu—CH $_2$—); 1.70–1.88 (m, 1H, CH in CH$_3$—CH<). $^{13}$C-NMR (CDCl$_3$): δ=23.5 (CH$_2$ in —CH$_2$—Si; 24.9 (CH in CH$_3$—CH<; 25.7 (CH$_3$ in CH$_3$—CH<); 30.6 (3CH$_3$ in tBu); 31.2 (C in tBu); 53.9 (CH$_2$ in tBu—CH$_2$—). The general resulting structure is shown below.

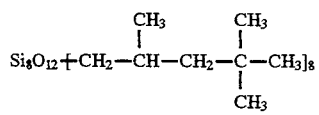

The resulting rates of conversion or disappearance of the Si—H groups (as determined by $^1$H-NMR spectroscopy) for the three siloxanes studied are shown and summarized in Table I below.

TABLE I

Hydrosilation of TMP by $D_6^H$, $MD_{38}^HM$, and $T_8^{H^a}$

| Time (hours) | Percent conversion of Si—H | | |
|---|---|---|---|
| | $D_6^H$ | $MD_{38}^HM$ | $T_8^H$ |
| 1 | 90 | 88 | 69 |
| 2 | 91 | 91 | 70 |
| 4 | 92 | 92 | 76 |
| 8 | 94 | 90 | 83 |
| 16 | 95 | 92 | 90 |

$^a$70° C., [Pt] = 16 ppm, 980 mg TMP, 20 mg siloxane. The low siloxane-concentration was due to the limited solubility of $T_8^H$ in TMP. All mixtures were homogeneous.

Close to quantitative conversions were obtained with all three hydrosiloxanes, even under the mild conditions employed. The rates of hydrosilation with $D_6^H$ and $MD_{38}HM$ were essentially identical, while $T_8^H$ was found to be somewhat less reactive which may be due to the steric hindrance and rigidity of the $T_8^H$ skeleton.

According to these data, hydrosilation of TMP occurs readily and yields essentially quantitative conversions. In view of these encouraging kinetic results, we proceeded to study the syntheses of the target star polymers.

To begin these syntheses, allyl- and isopropenyl-ended polyisobutylenes were synthesized as outlined above by living polymerization of isobutylene to a desired length followed by quantitative end-functionalization to the —CH$_2$CH=CH$_2$ or —CH$_2$C(CH$_3$)=CH$_2$ terminus. The products were characterized by $^1$H-NMR spectroscopy, and NMR spectra were recorded by the use of a Varian Gemini-200 spectrometer in standard 5 mm tubes at ambient temperature. Sample concentrations for proton spectroscopy were about 50 mg/mL in CDCl$_3$. Usually 64 FIDs were collected with 4 s repetition time for 15° pulses (6.7μ). Also, the number average molecular weights ($\overline{M}_n$) and molecular weight dispersities ($\overline{M}_w/\overline{M}_n$) of the PIB prearms were determined by a GPC instrument (Waters) equipped with a series of five μ-Styragel columns (100, 500, 10$^3$, 10$^4$, 10$^5$ Å, Waters), and a refractive index (RI) detector (Waters 410 Differential Refractometer, operating with Nelson Analytical Interfaces). Typical number average molecular weights ($\overline{M}_n$) of the polyisobutylene prearms range from 500 to 50,000 g/mol.

The siloxanes employed in these syntheses were $D_6^H$ and $T_8^H$, made according to the detailed description provided hereinabove.

In synthesizing $D_6^{PIB}$, PIB—CC=C (0.62 g, $\overline{M}_n$=123000 g/mol, $D_6^H$ (3.0 mg, 0.05 mmol), and 15 μL H$_2$PtCl$_6$ solution (0.5 wt.% Pt) in toluene (Shin-Etsu Chemical Co., Ltd.) were mixed in a vial, transferred into a dry ampule, and sealed under vacuum. The ampule was placed in an oven at 180° C. for 3 days.

For $T_8^{PIB}$, $T_8^H$ (2.7 mg, 0.05 mmol) was ground in an agate mortar by a pestle in the presence of PIB—CC=C (0.62 g, $\overline{M}_n$=123000 g/mmol). Then 15 μL H$_2$PtCl$_6$ solution (0.5 wt. % Pt) in toluene was added, and the mixture was transferred into a dry ampule. The ampule also was sealed under vacuum and placed in an oven at 180° C. for 3 days.

Where viscous PIB prearms (e.g., those having $\overline{M}_n$ equal to or greater than about 19,200 g/mol) were used for the preparation of relatively high molecular weight stars, the prearms were diluted with a small amount of cyclopentane to facilitate stirring. However, before sealing the ampules, most of the solvent was removed in vacuo.

Information needed to obtain the average number of arms ($N_n$) of the star polymers produced is summarizes in Table II hereinbelow.

TABLE II

Synthesis and Characterization of Star Polymers with PIB Arms and Silicone Cores$^a$

| | PIB prearms$^b$ | | | PIB stars | | | |
|---|---|---|---|---|---|---|---|
| Sample No. | $\overline{M}_n$ g/mol | $\overline{M}_w/\overline{M}_n$ | [C=C]/[Si—H] | $\overline{M}_n^c$ g/mol | (RI$^b$) g/mol | $\overline{M}_w/\overline{M}_n^c$ | $N_n$ |
| | | | $D_6^H$ + PIB-CC=C | | | | |
| 1 | 5200 | 1.23 | 1 | 29000 | (24000) | 1.05 | 5.5 |
| 2$^b$ | 12600 | 1.10 | 1 | 68000 | (57000) | 1.02 | 5.4 |
| | | | | 220000 | | 1.17 | 17.0 |
| 3 | 12600 | 1.10 | 2 | 73000 | (57000) | 1.08 | 5.8 |
| 4 | 19200 | 1.11 | 2 | 104000 | (84000) | 1.20 | 5.4 |

TABLE II-continued

Synthesis and Characterization of Star Polymers with PIB Arms and Silicone Cores[a]

| Sample No. | PIB prearms[b] $\bar{M}_n$ g/mol | $\bar{M}_w/\bar{M}_n$ | [C=C]/[Si—H] | PIB stars $\bar{M}_n{}^c$ g/mol | (RI[b]) g/mol | $\bar{M}_w/\bar{M}_n{}^c$ | $N_n$ |
|---|---|---|---|---|---|---|---|
| | | | $D_6{}^H$ + PIB-CC(C)=C | | | | |
| 5 | 670 | 1.19 | 1 | — | (3400) | 1.21[e] | 5.8[f] |
| 6[g] | 3800 | 1.06 | 1 | 18000 | (14200) | 1.03 | 4.65 (50%) |
| | | | | 58000 | (35000) | 1.22 | 15.00 (50%) |
| | | | $T_8{}^H$ + PIB-CC=C | | | | |
| 7 | 5200 | 1.23 | 1 | 37000 | (32000) | 1.10 | 7.0 |
| 8[d] | 12600 | 1.10 | 1 | 68000 | (60000) | 1.05 | 5.4 |
| | | | | 260000 | | 1.24 | 21.0 |
| 9[d] | 12600 | 1.10 | 2 | 78000 | (62000) | 1.03 | 6.2 |
| | | | | 300000 | | 1.17 | 24.0 |
| 10[d] | 19200 | 1.11 | | 113000 | (94000) | 1.03 | 5.9 |
| | | | | 270000 | | 1.16 | 14.0 |
| 11[d,h] | 19200 | 1.11 | 2 | 100000 | (102000) | 1.03 | 5.2 |
| | | | | 310000 | | 1.35 | 16.0 |
| | | | $T_8{}^H$ + PIB-CC(C)=C | | | | |
| 12 | 670 | 1.19 | 1 | 5400 | (4400) | 1.20 | 7.4 |
| 13[d] | 3800 | 1.06 | 1 | 20000 | (23000) | 1.01 | 5.2 |
| | | | | 63000 | | 1.56 | 16.0 |
| 14[d] | 3800 | 1.06 | 2 | 25000 | (22000) | 1.05 | 6.5 |
| | | | | 91000 | | 1.42 | 24.0 |

Figure 2:
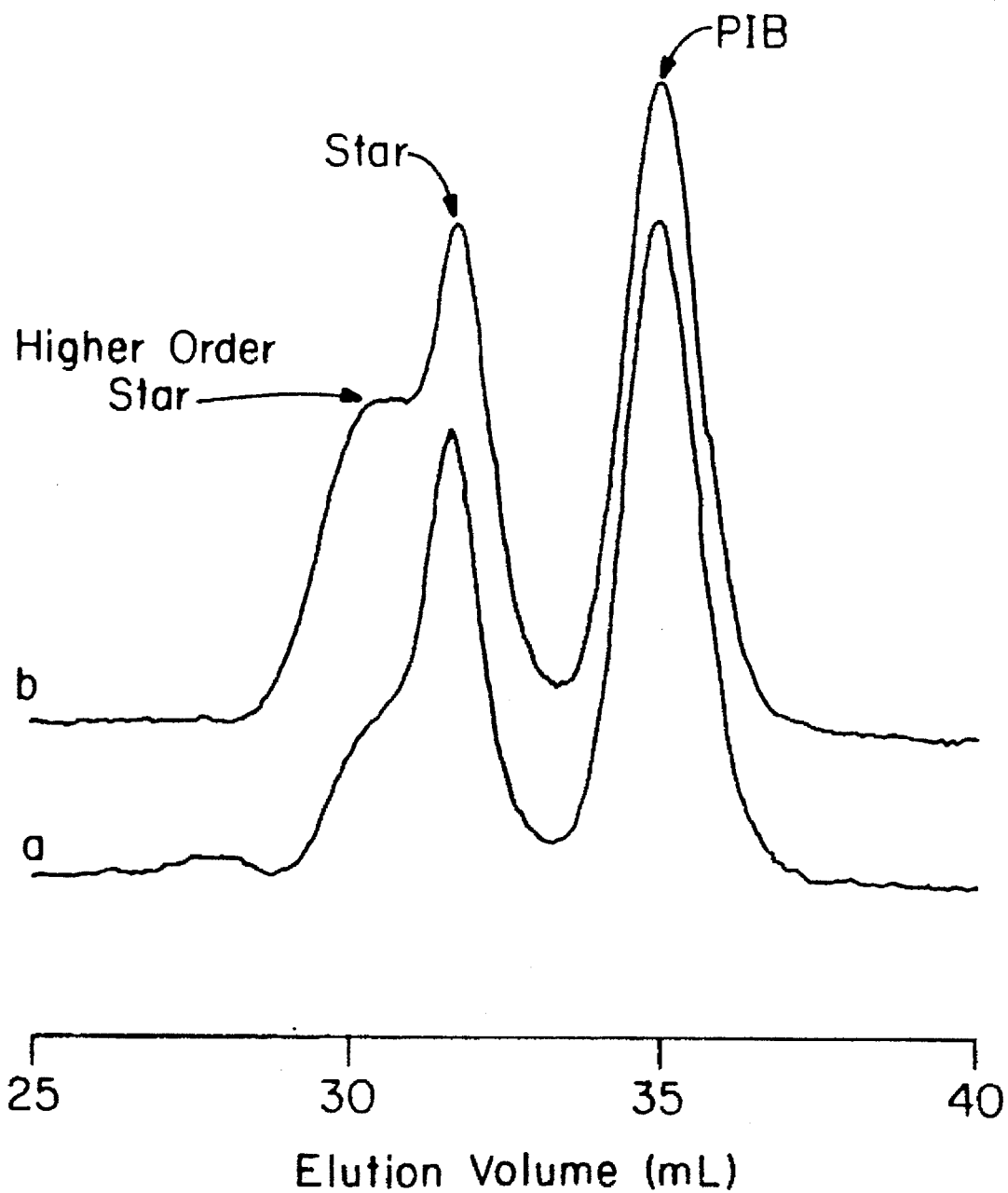
FIG. 2 are gel permeation chromatography (GPC) traces of the products obtained in: (a)-Sample 13 and (b)-Sample 14 (2.5-fold molar excess of water over Si—H) of Table II.

[a]Synthesis in bulk at 180° C., [Pt] = 100 ppm; 3 days for PIB-All, 7 days for PIB-CC(C)—C.
[b]Determined by refractive index detector, liner PIB standards for calibration.
[c]Determined by laser light scattering.
[d]GPC traces show a shoulder at high molecular weight shoulder (see FIG. 2). These shoulders are unresolved from the main peak by RI but separate peaks in the LLS.
[e]By RI data.
[f]Calculated from the $^1$H-NMR spectrum by comparing integrated intensities of tert-butyl group and unreacted Si—H.
[g]RI trace shows two separate peaks.
[h]2.5 mol water per 1 equivalent of Si—H was added.

With reference to Table II above, the first three columns show the number of the tested sample (Sample No.) and molecular characteristics of the olefin-ended PIB prearms ($\bar{M}_n$, $\bar{M}_w/\bar{M}_n$). The fourth column shows the molar ratio of the olefin endgroup (allyl or isopropenyl) relative to the Si—H groups in the synthesis charge. Column five gives the number average molecular weight of the stars. The data in the sixth column shown in parentheses are "apparent" star molecular weights calculated from RI data using liner PIBs for calibration. The purpose of including these data in Table II is to show that, as expected, these "apparent" molecular weights are consistently lower than laser light scattering (LLS) values because of the highly branched structure of the stars. Column seven shows the dispersity of our stars obtained by LLS and the final column gives $N_n$ calculated as follows:

$$\text{No. of arms} = \frac{\bar{M}_{n,star} - MW_{core}}{\bar{M}_{n,arm}}$$

where $\bar{M}_{n,star}$ is the number average molecular weight of the star obtained by the LLS, $\bar{M}_{n,arm}$ is the number average molecular weight of the PIB prearms obtained by RI detector, and $MW_{core}$ is the molecular weight of the silicone core.

The data are subdivided into four groups, i.e. the results obtained in the reaction with PIB—CC=C or PIB—CC(C)—C plus the six-functional cyclosiloxane $D_6{}^H$ (Samples 1-4 and 5-6, respectively), and the same prearms plus the eight-functional $T_8{}^H$ (Samples 7-11 and 12-14, respectively).

As shown by the data in Sample 1 and confirmed by GPC, the $D_6{}^H$+PIB—CC=C system yielded essentially exclusively the expected star. Although not bound by theory, the presence of a small amount of unreacted PIB—CC=C (elution volume at about 38 mL) was detected by the GPC trace of this sample which suggests that the reaction must have slowed down at high conversion (i.e., when the concentration of the reacting species has strongly diminished).

In Sample 2, a relatively higher molecular weight prearm ($\bar{M}_n$=12600 g/mol) was used. Besides the expected star ($\bar{M}_n$=68000 g/mol), the resultant product also contained a much higher molecular weight component ($\bar{M}_n$ about 220000 g/mol). This higher molecular weight component was evidenced by a distinct shoulder at lower elution counts in the RI trace corresponding to this sample. Again, although not to be bound by theory, the higher molecular weight component is believed to be most likely due to star-star coupling in the presence of adventitious water by the following reaction:

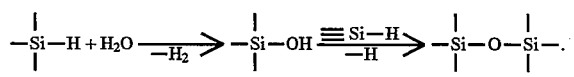

The Pt catalyst used for hydrosilation is also believed to accelerate this coupling reaction.

With respect to Sample 3 and 4, it will be appreciated that the $D_6{}^H$ +PIB—CC=C system yielded essentially exclusively the expected star, like Sample 1, although again, there was excess PIB—CC=C remaining in the system, especially in Sample 4.

Turning to the samples which employed $D_6^H$ in the presence of PIB—CC(C)=C (i.e., Samples 5 and 6), the amount of unreacted starting olefin in the final product was much higher (approximately 50%) than with the PIB—CC=C even though the molecular weight of the $D_6^H$+ PIB—CC(C)=C was relatively low (Sample 5). It is theorized that the methyl group adjacent to the unsaturation reduces the rate of hydrosilation. Furthermore, according to GPC evidence, star-star coupling also proceeds in this system (see Sample 6) as noted above with $D_6^H$+PIB—CC=C.

As noted above, Samples 7-14 were carried out with $T_8^H$. In contrast to hydrosilation with $D_6^H$ (i.e., Samples 1-6) in which both PIB—CC=C and PIB—CC(C)=C readily gave the expected 6 arm stars, the experiments with $T_8^H$ yielded slightly less than the expected 8 arm star, even with relatively low molecular weight prearms. Samples 7 and 12 yielded 7.0 and 7.4 arms, respectively. With higher molecular weight PIB prearms (Samples 8–10), the number of arms of the primary stars was only 5–6.5 at 60–80% conversion of Si—H groups. Moreover, these cyclic siloxanes yielded mostly higher than expected molecular weight star polymers, described herein as higher order stars, probably due to star-star coupling. FIG. 2 includes the GPC traces of Samples 13 (Trace a) and 14 (Trace b) of Table II. From these traces, one can readily see the distinct shoulder at lower elution counts.

In light of the suggested star-star coupling results noted above, two independent experiments were undertaken to substantiate the proposition of star-star coupling as the reason for the presence of higher order stars.

First, an experiment was conducted in which $H_2O$ was purposely added (specifically, 2.5 mole $H_2O$/Si—H) to the charge (Sample 11). Under these conditions, the GPC trace of the product clearly indicated the formation of significant amount of high molecular weight product.

The second experiment increased the [C=C]/[Si—H] ratio to about 2.0, thereby "outcompeting" the parasitic reaction with $H_2O$). In confirmation of the tested theory, the formation of the high molecular weight product was essentially completely eliminated even in the presence of relatively high molecular weight prearms.

The results obtained with the PIB+$T_8^H$ systems correlate well with those of the model experiments using TMP discussed hereinabove. In those experiments, the reaction between $T_8^H$ and TMP reached approximately 70% conversion within 1 to 2 hours; however, the rate significantly diminished thereafter.

It has been reported that in highly substituted aromatic compounds ("octopus molecules") steric interaction exists between the substituents (i.e., arms) due to their close proximity. Although not bound by theory, it is hypothesize that the reason for the reduced reactivity of $T_8^H$ which has been observed could be due to such a stearic hindrance at the rigid and compact $T_8$ core.

In order to determine whether steric interaction plays a part in the observation of fewer arms where $T_8$ cores are used, another experiment was conducted to determine the carbon-13 spin-lattice relaxation time ($^{13}C$ $T_1$) of several purposefully synthesized model compounds. Carbon-13 spin-lattice relaxation time ($^{13}C$ $T_1$) is a sensitive characteristic for studying the segmental and overall dynamics of molecules.

Figure 3:
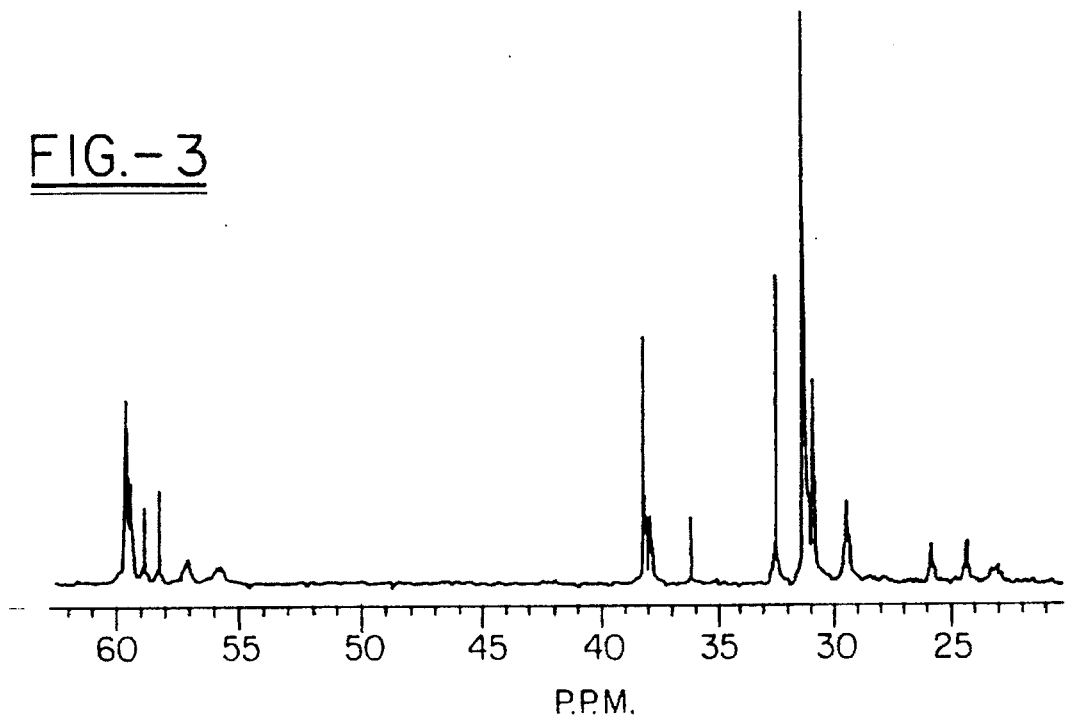
FIG. 3 is a representative $^{13}$C-NMR (50.3 MHz) spectrum of one star-shaped polyisobutylene containing a siloxane core ($T_6^H T_2 PIB$).

A representative $^{13}$C-NMR spectrum of a star-shaped PIB ($T_6^H T_2^{PIB}$) is shown on FIG. 3. The signal assignments and the data obtained on the relaxation times are summarized in the following structural schemes.

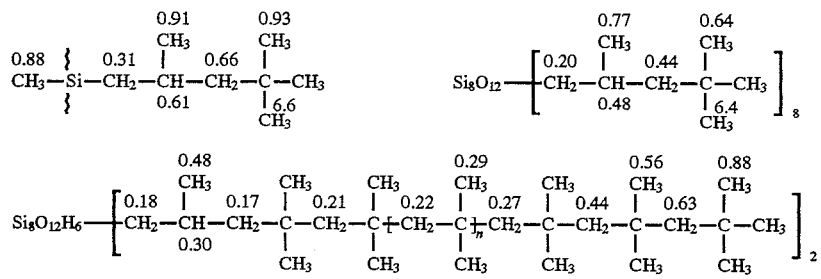
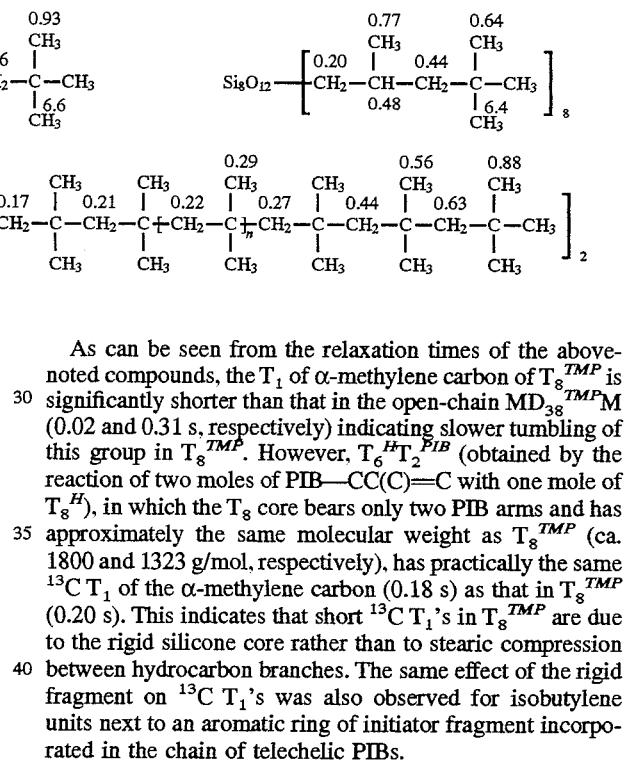

As can be seen from the relaxation times of the above-noted compounds, the $T_1$ of α-methylene carbon of $T_8^{TMP}$ is significantly shorter than that in the open-chain $MD_{38}^{TMP}M$ (0.02 and 0.31 s, respectively) indicating slower tumbling of this group in $T_8^{TMP}$. However, $T_6^H T_2^{PIB}$ (obtained by the reaction of two moles of PIB—CC(C)=C with one mole of $T_8^H$), in which the $T_8$ core bears only two PIB arms and has approximately the same molecular weight as $T_8^{TMP}$ (ca. 1800 and 1323 g/mol, respectively), has practically the same $^{13}C$ $T_1$ of the α-methylene carbon (0.18 s) as that in $T_8^{TMP}$ (0.20 s). This indicates that short $^{13}C$ $T_1$'s in $T_8^{TMP}$ are due to the rigid silicone core rather than to stearic compression between hydrocarbon branches. The same effect of the rigid fragment on $^{13}C$ $T_1$'s was also observed for isobutylene units next to an aromatic ring of initiator fragment incorporated in the chain of telechelic PIBs.

Thus, the 13C relaxation time tests indicate that, although the rigid $T_8$ silicone core restricts the mobility of hydrocarbon arms, there is no evidence of stearic interaction between the arms. Apparently there is enough room around $T_8$ to place eight TMP fragments, but after reaching about 70% conversion of Si—H groups (5–6 arms), the access of the bulky catalytic complex to the unreacted Si—H functions groups becomes limited.

It should thus be evident that the methods of the present invention are highly effective in synthesizing star-shaped polyisobutylenes with siloxane cores. The invention is particularly suited for cyclosiloxanes, but is not necessarily limited thereto. Even more particularly, it has been demonstrated that multiple olefin-capped (e.g., allyl- or isopropenyl-terminated) PIB arms may be linked to multi-functional hydrogencyclosiloxanes via hydrosilation. Such multi-arm star polymers are seen as having utility as motor oil additives and the like, although it will be appreciated that the subject star polymers may be readily useful in a variety of applications, including the manufacture of other materials as well. Still further, it will be appreciated that olefin-terminated PIB prearms, and particularly allyl-terminated PIB prearms give well-defined star polymers whereas isopropenyl-terminated PIBs may produce higher order stars as well. In the presence of adventitious trace of water in the synthesis charge, a parasitic reaction may occur which gives rise to higher order star polymers by star-star coupling. It desired, such higher order star polymers can be eliminated by the use of allyl-capped PIBs and/or high [C=C]/[Si—H] ratios.

Based upon the foregoing disclosure, it should now be apparent that the novel star polymers described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, siloxanes employed according to the present invention are not necessarily limited to cyclosiloxanes. Moreover, the polyisobutylene arms of the present invention may be prepared based upon a variety of methods. Thus, the scope of the invention shall include all modifications and variations that may fall within the scope of the attached claims.

What is claimed is:

1. A star polymer comprising:
   a core component selected from the group consisting of siloxanes containing at least two Si—H groups; and
   a plurality of arms attached to said core component and selected from the group consisting of olefin-terminated polyisobutylenes.

2. The star polymer of claim 1, wherein said siloxanes are cyclosiloxanes.

3. The star polymer of claim 1, wherein said olefin-terminated polyisobutylenes are selected from the group consisting of allyl-terminated polyisobutylenes and isopropenyl-terminated polyisobutylenes.

4. The star polymer of claim 1, wherein said polyisobutylenes have a number average molecular weight of from about 500 g/mol to about 50,000 g/mol.

5. The star polymer of claim 4, wherein said polyisobutylenes have a number average molecular weight of about 1000 g/mol to about 20,000 g/mol.

6. A star polymer having a higher molecular weight than the star polymer of claim 1, formed by the coupling of at least two star polymers of claim 1.

7. The star polymer of claim 1 wherein said core component is an octasilsesquioxane ($T_8$) core.

8. A composition comprising the star polymer of claim 1.

9. A star polymer comprising:
   a core, wherein said core includes a plurality of siloxane groups; and
   a plurality of polyisobutylene arms attached to said core.

10. The star polymer of claim 9, wherein each of said polyisobutylene arms has a number average molecular weight of from about 500 g/mol to about 50,000 g/mol.

11. The star polymer of claim 10, wherein each of said polyisobutylene arms has a number average molecular weight of about 1000 g/mol to about 20,000 g/mol.

12. A method for synthesizing a star polymer containing a well-defined, siloxane core and a plurality of olefin-terminated polyisobutylene arms emanating from said siloxane core, comprising the step of:
   linking said polyisobutylene arms to said core by hydrosilation.

13. The method of claim 12 wherein said siloxane core is selected from the group consisting of cyclosiloxanes.

14. The method of claim 12 wherein said siloxane core has at least two Si—H groups.

15. The method of claim 13 wherein said polyisobutylene arms are selected from the group consisting of allyl-terminated polyisobutylenes and isopropenyl-terminated polyisobutylenes.

16. The method of claim 12 further comprising the step of increasing the ratio of C=C groups to Si—H groups so as to eliminate star-star coupling.

* * * * *